(12) United States Patent
Pasternak

(10) Patent No.: US 7,564,560 B2
(45) Date of Patent: Jul. 21, 2009

(54) SPECTROPHOTOMETER WITH WIDE INLET SLIT

(75) Inventor: Frédérick Pasternak, Gaure (FR)

(73) Assignee: Astrium SAS, Paris (FR)

( * ) Notice: Subject to any disclaimer, the term of this patent is extended or adjusted under 35 U.S.C. 154(b) by 264 days.

(21) Appl. No.: 11/564,455

(22) Filed: Nov. 29, 2006

(65) Prior Publication Data

US 2007/0229820 A1 Oct. 4, 2007

(30) Foreign Application Priority Data

Dec. 1, 2005 (FR) .................................. 05 12209

(51) Int. Cl.
*G01B 9/02* (2006.01)
*G01J 3/45* (2006.01)
(52) U.S. Cl. ...................................................... 356/451
(58) Field of Classification Search ................ 356/319, 356/323, 324, 451, 456
See application file for complete search history.

(56) References Cited

U.S. PATENT DOCUMENTS

| | | | | |
|---|---|---|---|---|
| 5,164,786 A | * | 11/1992 | Delhaye et al. | ............. 356/326 |
| 6,963,405 B1 | * | 11/2005 | Wheel et al. | ................ 356/456 |
| 7,170,610 B2 | * | 1/2007 | Knuttel | ....................... 356/456 |

FOREIGN PATENT DOCUMENTS

FR 2 858 404 2/2005

OTHER PUBLICATIONS

French Preliminary Search Report FR 0512209; report dated Jul. 31, 2006.

* cited by examiner

*Primary Examiner*—Michael A Lyons
(74) *Attorney, Agent, or Firm*—Miller, Matthias & Hull

(57) ABSTRACT

A spectrophotometer incorporating an interferometer and a dispersive system is adapted to have an enlarged inlet field without degrading its spatial resolution. To this end, spectral data deduced horn measurements performed by means of the interferometer are transferred into spectral data deduced from measurements per formed by means of the dispersive system. Such spectrophotometer makes it possible to scan an observation field quickly, and is compatible with use on board a satellite.

8 Claims, 3 Drawing Sheets

SPECTROPHOTOMETER WITH WIDE INLET SLIT

FIELD OF THE DISCLOSURE

The present invention relates to a spectrophotometer in which an interferometer is associated with a dispersive system.

BACKGROUND OF THE DISCLOSURE

Such an interferometer is known, in particular from French patent application 2 858 404 published on Feb. 4, 2005 in the name of the proprietor of the present patent application. It makes it possible to obtain simultaneously an image of a field in which there are light sources, together with spectral analysis of the light emitted by these sources. In particular, when it is combined with a telescope placed in front of the inlet to the spectrophotometer, it can be used for making space or terrestrial observations.

FIG. 1a shows an example of how the various optical elements can be arranged within such spectrophotometer. For reasons of clarity, the dimensions of the optical elements shown in the figure and the distances between the elements are not proportional to actual dimensions and distances. Furthermore, optical elements that are known to the person skilled in the art are not described in detail below. Indications are merely given concerning their use within the spectrophotometer.

As shown in FIG. 1a, a Fourier transform interferometer 3 is arranged to receive at its inlet a primary light beam F2 and to deliver at its output an intermediate light beam F7. By way of example, the primary beam F2 may originate from a source S that is to be observed and that is situated within the inlet field of the interferometer 3.

In a spectrophotometer for spatial or terrestrial observation, the source S is situated at a great distance from the spectrophotometer. The figure then shows only the direction in which said source S is situated. In the jargon of the person skilled in the art, the source S is said to be "situated at infinity". An inlet optical unit 2, which may be of the telescope unit type, produces the primary beam F2 from an inlet light beam F1 emitted by the source S. The inlet optical unit 2 forms an image S' of the source S. It should be understood that the operation principle described in detail herein for a source S situated at infinity can be transposed to a source S situated at a finite distance from the spectrophotometer. How to perform such a transposition is well known and is not specific to the system described.

The Fourier transform interferometer 3 produces an interferogram of the light emitted by the source S. This interferogram extends along a direction D1 of variation in an optical path length difference that extends perpendicularly to the plane of FIG. 1a.

The interferometer 3 may in particular be of the Michelson type. It then comprises:

a splitter device 31 that splits the intensity of the primary beam F2 into two secondary beams F3 and F4 propagating in respective directions D0' and D0. D0 may be the direction along which the primary beam F2 enters the interferometer 3, while D0' is conjugate relative to direction D0 by the splitter device 31. By way of example, the splitter device 31 may comprise a planar semi-reflective plate disposed in a plane containing direction D1 and extending at 45° relative to direction D0;

two mirrors 32 and 33 disposed respectively to reflect the secondary beams F3 and F4 so as to form first and second reflected secondary beams F5 and F6; and a combiner device disposed to combine the reflected secondary beams F5 and F6 so as to form the intermediate beam F7. In known manner for Michelson type interferometers, the splitter device 31 also performs the function of combining the reflected secondary beams F5 and F6.

In FIG. 1a, for reasons of clarity, the beams F3-F6 are represented solely by their respective propagation directions.

Mirrors 32 and 33 may both be planar mirrors. Each exhibits a determined angle respectively relative to the propagation directions of the secondary beams F3 and F4. Mirror 32 is perpendicular to direction D0', and mirror 33 may be titled about an axis B-B that is perpendicular to directions D0 and D1. The tilt-angle of mirror 33 lies, for example, in the range 0.2° to 5°.

An optical path length difference results from the respective tilt-angles of the mirrors 32 and 33 between two portions of a given light ray of the primary beam F2 as split by the device 31. These two light ray portions belong respectively to the secondary beams F3 and F4, and each of them is reflected by the corresponding mirror 32 or 33. The light ray portions also belong to the reflected secondary beams F5 and F6 and they are combined by the device 31 within the intermediate beam F7. The intermediate beam F7 thus corresponds to an interference pattern of the reflected secondary beams F5 and F6. The difference in the optical path lengths traveled by the two light ray portions depends on the locations of the points at which they are respectively reflected on the mirrors 32 and 33. More specifically, it depends on the locations of the points of reflection measured along the direction D1. In other words, this optical path length difference varies during displacement of the points of reflection along the direction D1, i.e. during displacement of the source S in a plane perpendicular to that of FIG. 1a and containing direction D0. Direction D1 is also perpendicular to the propagation direction of the intermediate beam F7.

The distance between the interferometer 3 and the inlet optical unit 2 is set in such a manner that the image S' of the source S is formed inside the interferometer 3, substantially at the mirrors 32 and 33. Image S' then corresponds to the point at which the secondary beam F4 is reflected on mirror 33.

A dispersive system 6 is arranged so as to receive at its inlet the intermediate beam F7. It may comprise a collimator lens 5, a prism P, and a focusing lens 7 arranged so that the light from the intermediate beam F7 passes successively through the collimator lens 5, the prism P, and then the focusing lens 7. In FIG. 1a, the lenses 2, 5, and 7 are represented symbolically by respective individual lenses, however each of them could be constituted by a more complex lens assembly. By way of example, collimator 5 is arranged to transform the intermediate beam F7 into a parallel beam that passes through the prism P. The focusing lens 7 is arranged to form a final image $S_D(\lambda)$ of the source S in a plane conjugated with the mirror 32. Prism P disperses the light from the intermediate beam F7 angularly in a direction D2 that is substantially perpendicular to the propagation direction of the light. A set of images $S_D(\lambda)$ corresponding to different dispersed wavelengths $\lambda$ are thus formed simultaneously. The images $S_D(\lambda)$ aye offset mutually along a direction D4 that is conjugate with the dispersion direction D2 by the focusing lens 7.

In known manner, the prism P can be replaced by a diffraction grating, without changing the operation of the spectrophotometer.

The interferometer 3 and the dispersive system 6 are oriented relative to each other in such a manner that the dispersion direction D2 is substantially perpendicular to the direction D1 in which optical path length difference varies.

Finally, a planar matrix of photodetectors 8 is arranged in the plane that is conjugate with the mirror 32 and that contains the images $S_D(\lambda)$. Consequently, a spectrophotometer of the type considered in the present invention possesses an imaging function: on the matrix 8 of photodetectors, it produces an image of each source S that is situated in the inlet field. As shown in FIG. 1b, the matrix 8 is composed of photodetectors distributed in columns C and rows L that are perpendicular to the columns. The columns C are parallel to a direction D3 and the rows of the matrix 8 are parallel to a direction D4. Consequently, the direction D4 is the direction in which the columns C of the matrix 8 are offset relative to one another.

Within the spectrophotometer, the matrix 8 of photodetectors is oriented in such a manner that the direction D3 of the columns C is conjugate with the direction D1 in which optical path length difference varies. For a system of the kind shown in FIG. 1a, direction D3 is parallel to direction D1. Direction D4 then corresponds to the dispersion direction D2.

In a preferred embodiment of such a spectrophotometer, at least one of the two mirrors of the interferometer, e.g. mirror 33, is of the echelette-grating type. It is constituted by elementary faces perpendicular to direction D0, in the form of reflecting planar strips elongate parallel to the axis B-B and offset relative to one another along direction D0. The offset of each elementary face in direction D0 defines the optical path length difference and varies in the direction D1. The width of the elementary faces of mirror 33 is also determined in such a manner that the product of this width multiplied by the optical magnification existing between mirror 33 and the matrix 8 of photodetectors is equal to the dimension of the photodetectors of the matrix 8 along direction D3. Each elementary face of mirror 33 is thus conjugate with a respective row L of photodetectors. Under such circumstances, the number of photodetectors in a column C of matrix 8 is preferably not less than the number of elementary faces of the mirror 33.

Mirrors 32 and 33 may also be both of the echelette-grating type. Under such circumstances, the optical path length difference results from the offsets between the elementary faces of the two mirrors. In particular, the mirrors can be arranged in such a manner that the elementary optical faces of each of them are conjugate optically with respective faces of the other mirror by the splitter device 31.

An intermediate optical unit 10 may also be placed on the path of the intermediate beam F7 so as to produce an intermediate image S" of the source S. A rectangular slit 4 is placed level with the image S", in a plane substantially perpendicular to the propagation direction of the intermediate beam F7. The slit 4 is long parallel to direction D1 and presents a width l parallel to direction D0. In conventional manner, the slit 4 acts as an inlet slit for the dispersive device 6, and each column C of photodetectors in the matrix 8 performs an outlet slit function for the dispersive system 6.

Optionally, a two-axis optical scanner device 1 can also be arranged on the path of the inlet beam F1. The first axis of rotation of the scanner device 1 is perpendicular to directions D0 and D0', and is denoted Z-Z. The second axis of rotation of the device 1, denoted A-A, is perpendicular to the axis Z-Z and can turn thereabout. An inlet aperture of the scanner device 1 then sweeps over an observation field in which the light source S is located, so that the inlet beam F1 possesses, at the outlet from the scanner device 1, a propagation direction that is unchanging relative to the spectrophotometer and substantially parallel to the direction D0. During rotation of the scanner device 1 about axis Z-Z, the image S' of the source S moves parallel to the axis B-B. During rotation of the scanner device 1 about the axis A-A, the image S' of the source S moves parallel to the direction D1.

The operation of such a spectrophotometer is described below. Images $S_D(\lambda_i)$ of a given light source S are formed on each column C of the matrix 8 of photodetectors. The dispersed wavelength $\lambda_i$ is defined by the offset in the direction D4 of the column C in question. It is in fact a mean value which corresponds substantially to the middle position of the column C in question in the direction D4.

Simultaneously, during rotation of the scanner device 1 about the axis A-A, the photodetectors in each column C of the matrix 8 record an interferogram of the light of the inlet beam F1. Direction D3 is thus simultaneously an interferogram direction and a spatial displacement direction in the image that the spectrophotometer forms of sources situated in the inlet field By means of a Fourier transform of the light energy received by the photodetectors in the column C corresponding to the wavelength $\lambda_i$, it is possible to calculate precisely the spectral distribution of energy over a range centered around $\lambda_i$.

The term spatial resolution in the direction D3 or the direction D4 is used to designate the minimum separation distance between two light sources having images on the matrix 8 that are offset in the direction D3 or D4, respectively. For light sources situated at infinity, the distance between the light sources is an angular distance. The spatial resolution in the direction D3 is determined by the dimension of a photodetector of the matrix 8 in said direction. The spatial resolution in the direction D4 is determined by the width l of the slit 4.

The term spectral resolution is used to designate the minimum difference between two wavelengths for which the respective light intensities can be measured or deduced separately from each other. In known manner, the spectral resolution of the interferometer 3, which appears along direction D3, is associated with the number of detectors in a column C of the matrix 8. The spectral resolution of the dispersive system 6 which appears along direction D4 results from the width l of the slit 4 and from the dimension of the photodetectors in the matrix 8 along direction D4.

Below, Y denotes a displacement axis in the image that the spectrophotometer forms of light sources situated in the inlet field, and corresponding to direction D4. Similarly, DS designates a wavelength variation axis of the light that is detected during a displacement over the matrix 8 parallel to the direction D4. DS is referred to as the spectral dispersion axis and corresponds to the dispersion function of the system 6.

FIG. 2a shows the origins of the contributions to the light energy detected along a row of the matrix 8, in a chart identified by axes DS and Y. The spectral dispersion axis DS is shown as the abscissa and the displacement axis Y as the ordinate. A central point in this diagram corresponds to the wavelength $\lambda_0$ which is taken as the origin for the dispersion generated by the system 6.

The spatial and spectral resolutions discussed below are displayed by equivalence in this diagram. The two opposite edges of the slit 4 correspond to respective images on the matrix 8 which are separated by a distance $\delta y_s$ along direction Y (s index denoting "slit"). The distance $\delta y_s$ is equal to the width l of the slit 4 multiplied by the optical magnification G generated by the portion of the spectrophotometer present between the plane of the slit 4 and the plane of the matrix 8 of photodetectors ($\delta y_s = l \times G$). The points on the row of the matrix 8 that correspond to the images of the two edges of the slit 4 can also correspond to light-intensities detected respectively for wavelengths $\lambda_0 - \delta\lambda_s/2$ and $\lambda_0 + \delta\lambda_s/2$, where $\delta\lambda_s$ is a first contribution to the spectral resolution of the dispersive system 6 generated by the slit 4.

Finally, the dimension of each detector of the matrix 8, measured along direction D4, generates a second contribution to the spectral resolution of the dispersive system. This second contribution is denoted $\delta\lambda_d$ and is also referred to as the spectral sampling internal of the photodetectors. It is equal to the dimension d of the photodetectors along direction D4 divided by a linear dispersion coefficient $\Gamma$ of the system 6 ($\delta\lambda_d = d/\Gamma$).

The area of the shading A provides a measure of the light energy that is detected by the photodetectors of a row L of the matrix 8, and that can be attributed to the central wavelength $\lambda_0$.

The diagram of FIG. 2*a* shows that the distance denoted $\delta y_s$ is the spatial resolution along direction D4. Indeed, the light energies that are detected respectively at two points along a row L of the matrix 8 that are separated by a distance that is less than $\delta y_s$ can correspond to light rays having different wavelengths and that originate from the same light source S.

To improve spatial resolution along direction D4, it is therefore common practice to reduce the width l of the slit 4 so that the distance $\delta y_s$ on the matrix 8 corresponds to the dimension of the photodetectors along direction D4. In other words, the width l of the slit 4 is usually set in such a manner that the width of the image of the slit 4 on the matrix 8 is equal to the thickness of one column C of photodetectors: $l = d/G$, such that $\delta y_s = d$. The inlet field of the spectrophotometer for which an image is formed on the matrix 8 during a given exposure is then a very narrow strip, having a width in the image that corresponds to the width of a single column of photodetectors. This inlet field that is viewed by the spectrophotometer during a single exposure is thus very narrow.

Consequently, when the spectrophotometer is combined with the scanner system 1, scanning by rotation about the axis Z-Z must be performed with a very short pitch in order to obtain recordings that correspond to contiguous strips in the observation field. The duration of the resulting scan is then very long.

FIG. 2*b* shows the spectral response function of the spectrophotometer, denoted Rep, along a row L of the matrix 8 of photodetectors.

An object of the present invention thus consists in proposing a spectrophotometer of the type described above, which exhibits an inlet field that is wider along direction Y without impairing resolution.

SUMMARY OF THE DISCLOSURE

To this end, the invention provides a spectrophotometer that comprises:

a matrix of photodetectors distributed in columns and rows along two perpendicular directions, this matrix of photodetectors being placed in an image plane of the spectrophotometer;

an interferometer arranged to produce, on a column of the matrix of photodetectors, an interferogram of a light source situated in an inlet field of the spectrophotometer;

a dispersive system arranged on the path of the light beams passing through the interferometer, and arranged to disperse light parallel to the rows of the matrix of photodetectors; and a slit arranged in an intermediate image plane between the inlet of the spectrophotometer and the matrix of photodetectors, the slit having a width direction conjugated with the row direction of the matrix of photodetectors.

According to the invention, the interferometer has a spectral resolution less than the spectral sampling interval of the photodetectors along the row direction of the matrix. And also the width of the slit is adapted so that a spectral resolution of the dispersive system generated by the slit is greater than the spectral sampling interval of the photodetectors along the row direction of the matrix.

The slit then makes it possible in a single exposure to form on the matrix of photodetectors an image of a broad strip in the inlet field. Thanks to the invention, two points that emit light and that are in alignment along the width direction of the strip can be distinguished from each other in the information extracted from the detected light energies. A scan of an observation field in a direction corresponding to the rows of the matrix of photodetectors can then be performed with a large pitch, while nevertheless obtaining complete coverage made up of contiguous strips in the inlet field. The number of exposures needed to cover an entire observation field is then small, and the total duration of scanning is compatible with using the spectrophotometer on board a satellite.

In addition, by means of the invention, effective spatial resolution is obtained for the spectrophotometer along the row direction of the matrix of photodetectors that is smaller than the resolution that would result solely from the width of the slit. This improvement in resolution is obtained by transferring light energy measurements sensed along the column direction of the matrix of photodetectors into measurements sensed along the row direction of the matrix.

In a preferred embodiment of the invention, the width of the slit is also adapted so that a dimension of the image of the slit on the matrix of photodetectors is equal to the dimension of the photodetectors multiplied by R, said dimensions of the image of the slit and of the photodetectors being measured along the row direction of the matrix of photodetectors, where R is the quotient of the spectral sampling interval of the photodetectors along the row direction of the matrix divided by the spectral resolution of the interferometer. The interferometer is then used in optimal manner for improving spatial resolution along the row direction of the matrix of photodetectors.

Advantageously, the interferometer includes a Michelson apparatus. The Michelson apparatus is itself provided with a planar mirror and an echelette-grating mirror disposed to reflect respective portions of the light beam emitted by a source situated in the inlet field of the spectrophotometer. Alternatively, both mirrors of the Michelson apparatus may be echelette-grating mirrors. Spatial and spectral measurements of light sources can then be obtained that are particularly accurate.

The spectrophotometer may also include a scanner device that is placed at the inlet of the spectrophotometer, and that has two scanning directions conjugated respectively with the column direction and with the row direction of the matrix of photodetectors. A large field of observation can then be covered quickly by successive exposures in automatic manner.

Finally, the invention provides a satellite including an on-board spectrophotometer in accordance with the invention. Such a satellite can be used for making spatial or terrestrial observations while it is orbiting.

BRIEF DESCRIPTION OF THE DRAWINGS

Other features and advantages of the present invention will appear from the following description of non-limiting embodiments, given with reference to the accompanying drawings, in which:

FIG. 2a is a diagram showing the light energy contribution measured along the rows of the FIG. 1a matrix of photodetectors for a spectrophotometer in accordance with FIG. 1a;

FIG. 3b corresponds to FIG. 2b for the spectrophotometer of the invention as shown in FIG. 3a.

DETAILED DESCRIPTION

Figure 1A:
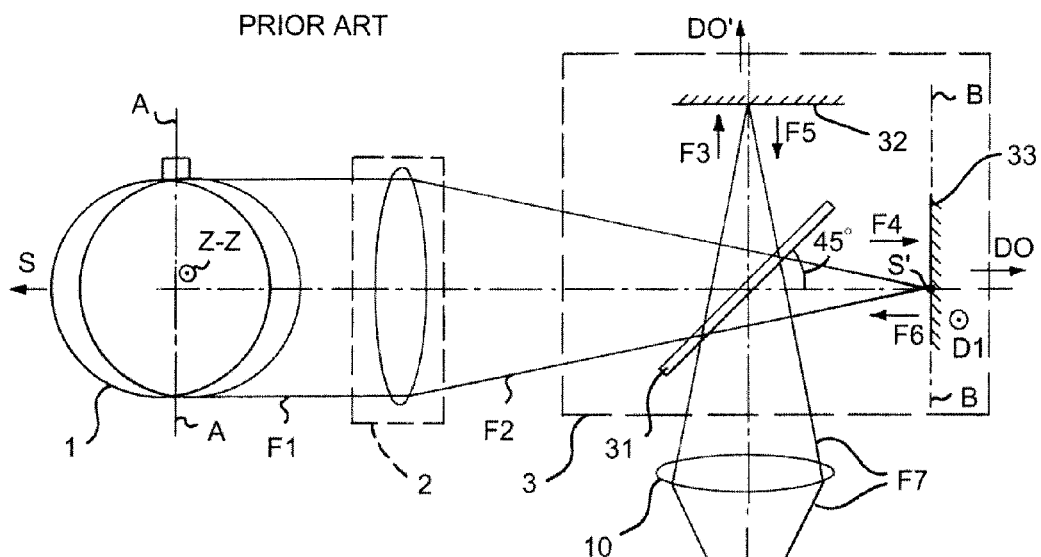
FIG. 1*a* is an optical diagram showing the principle of a prior art spectrophotometer to which the invention can be applied.
Figure 1B:
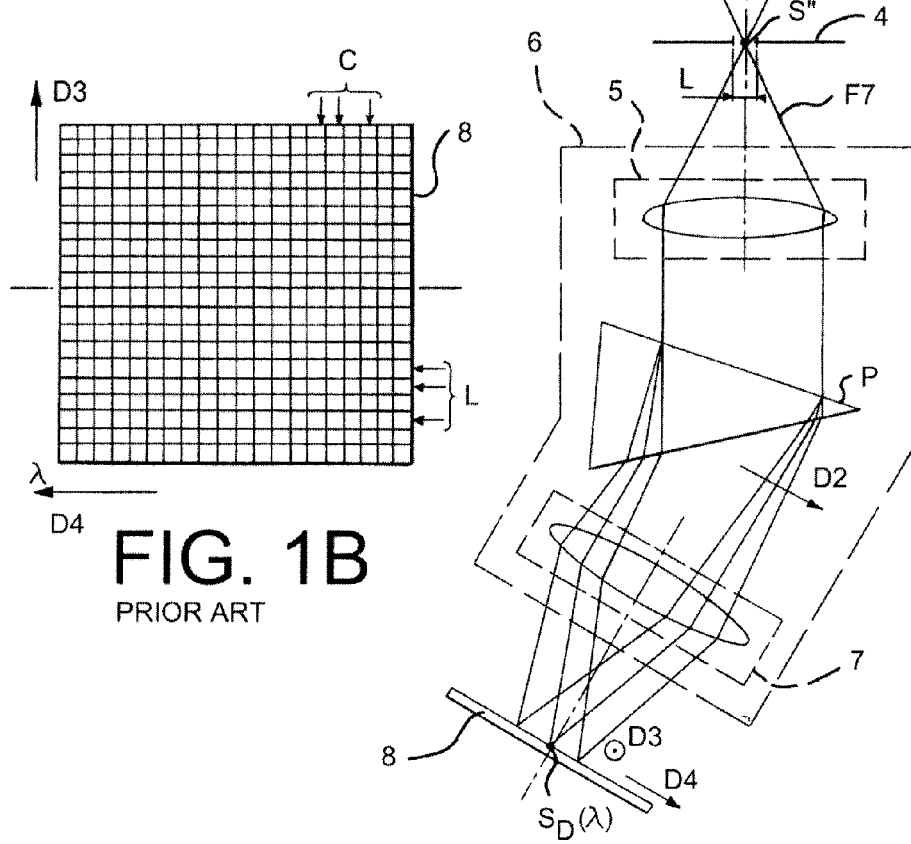
FIG. 1*b* shows a matrix of photodetectors suitable for use in the spectrophotometer of FIG. 1*a*.

FIGS. 1a, 1b, 2a, and 2b, relating to the known prior art, have been described in detail above.

There follows a description of a particular embodiment of the invention. A spectrophotometer of the invention can possess a structure identical to that described with reference to FIGS. 1a and 1b. The echelette-grating mirror 33 possesses N elementary reflecting faces offset at a pitch p. Each column C of the matrix 8 has N photodetectors, and the length of the slit 4 along direction D1 is sufficient for an image of a complete slice of the mirror 33 parallel to the direction D1 to be formed on the matrix 8. The rows of the matrix 8 are then optically conjugated with respective elementary reflecting faces of the mirror 33. This corresponds to an interferometer model for which the relative positions of the mirrors 32 and 33 along direction D0 and D0' is known initially with accuracy.

According to the first characteristic of the invention, the number N is selected so that the spectral resolution $\delta\lambda_i$ of the interferometer 3 is smaller than the contribution $\delta\lambda_d$ to the spectral resolution of the dispersion system 6 that is due to the dimension d of the photodetectors. Use is made of the quotient R that is equal to the spectral sampling interval of the photodetectors along direction D4 divided by the spectral resolution of the interferometer 3. $R=\delta\lambda_d/\delta\lambda_i$. R is greater than 1. By way of example, N may be equal to 64 or 128.

The spectral resolution $\delta\lambda_s$ of the dispersive system 6 that is associated with the slit 4 is proportional to the width $\delta y_s$ of the image thereof on the matrix 8 of photodetectors along the direction D4: $\delta\lambda_s=\delta y_s/\Gamma=l\times G/\Gamma$.

According to the second characteristic of the invention, the width l of the slit 4 is selected so that $\delta\lambda_s$ is greater than the spectral sampling interval $\delta\lambda_d$ of the photodetectors along the row direction L of the matrix. To this end, the width l must be greater than d/G.

Figure 2A:
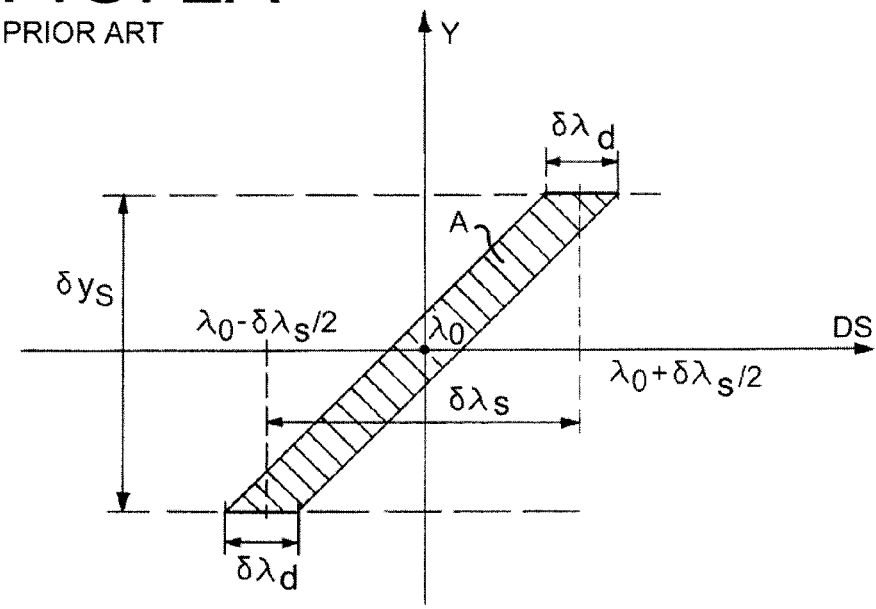
Figure 2B:
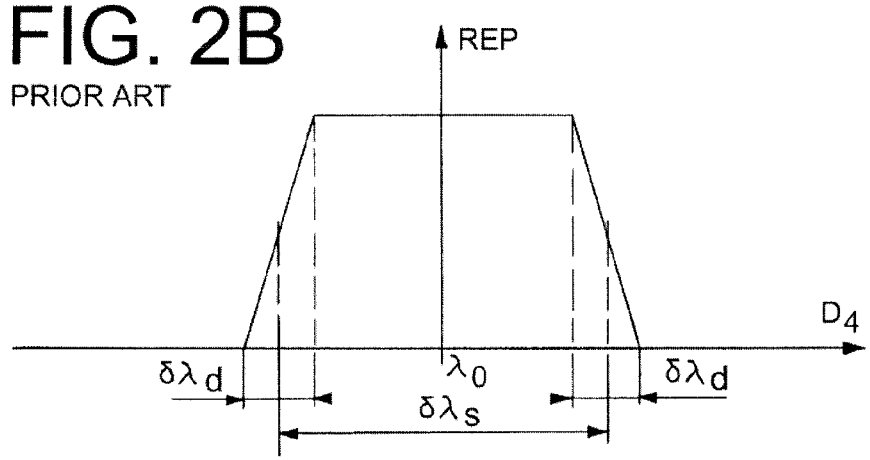
FIG. 2b shows the response function of the spectrophotometer shown in FIG. 2a, along the row direction of the matrix of photodetectors.
Figure 3A:
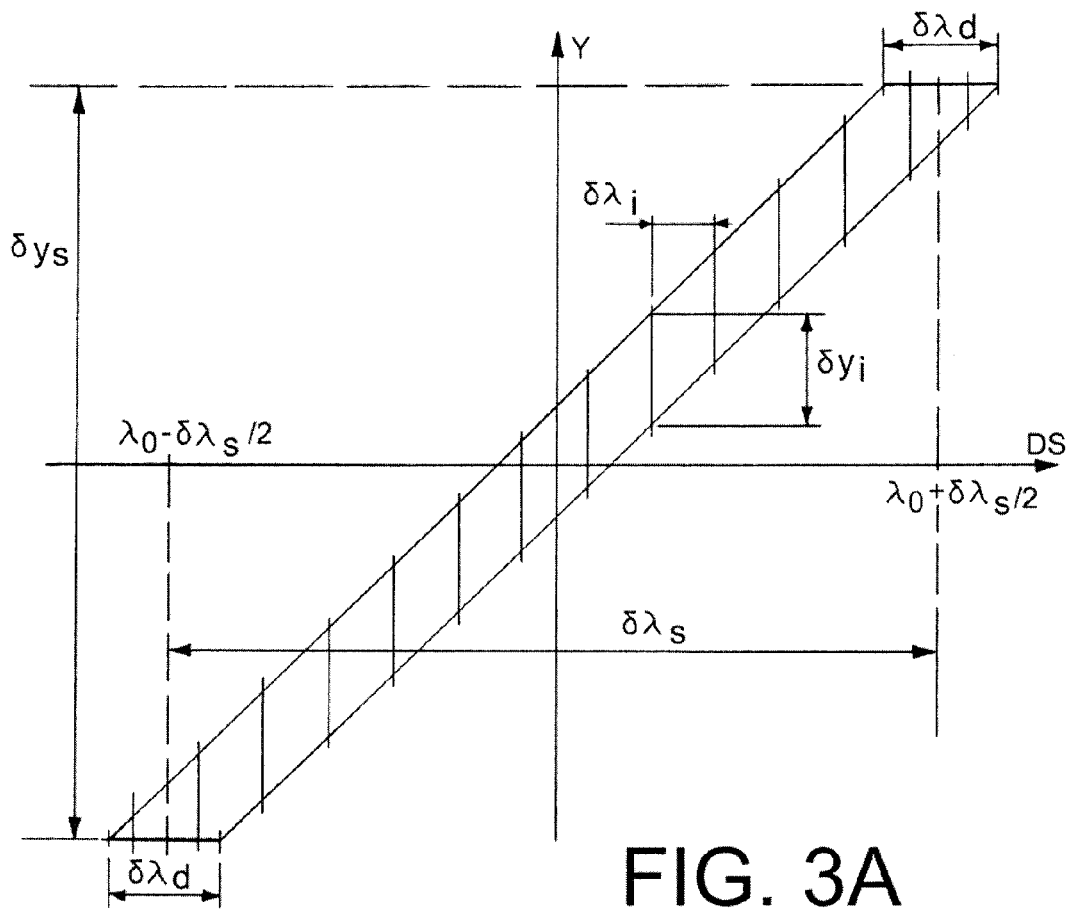
FIG. 3a corresponds to FIG. 2a for a spectrophotometer of the invention.

FIG. 3a corresponds to FIG. 2a when the characteristics of the invention are implemented, i.e. when $\delta\lambda_i<\delta\lambda_d<\delta\lambda_s$. By transferring the spectral resolution $\delta\lambda_i$ of the interferometer 3 onto the spectral direction DS associated with direction D4, wavelength variation along each row L is divided into elementary intervals, for each of which the light energy spectral distribution can be deduced from the light energies detected on one of the columns C of the matrix 8. There then appears a new spatial resolution associated with direction D4, which is denoted $\delta y_i$. This spatial resolution $\delta y_i$ results from the spectral resolution $\delta\lambda_i$ and the slope visible in the diagram of FIG. 3a of the contributions to the detected light energy. From FIG. 3a: $\delta y_i=\delta y_s\times\delta\lambda_i/\delta\lambda_s$. The spectral resolution $\delta y_i$ that is obtained is thus less than the spatial resolution $\delta y_s$ that would result solely from the width of the slit 4. The following obtains: $\delta y_i=\Gamma\times\delta\lambda_i$, whence: $\delta y_i<d$. In other words, the spatial resolution along direction D4 that results from the combination of the invention whereby measurements performed using the dispersive system 6 are combined with measurements performed using the interferometer 3 is smaller than the resolution that results from the dimension of the slit. This spatial resolution is obtained even through the width of the inlet field strip that is viewed in a single exposure is increased.

Preferably, the width of the slit 4 is selected so that the dimension of the image of the slit 4 on the matrix 8 of photodetectors is equal to the dimension of the photodetectors multiplied by N, these dimensions being considered along direction D4. In other words, $\delta y_s=N\times d$. For this purpose, $l=N\times d/G$. The strip width in the inlet field that is viewed in a single shot is thus increased by a factor N, while allowing optimum use of the measurements performed by means of the interferometer 3 for obtaining small spatial resolution along direction D4.

If the relative position of the mirrors 32 and 33 is unknown initially, it can be determined by comparing the light energies detected for positive and negative values of the optical path length difference. The offsets of the elementary reflecting faces of the mirror 33 are then corrected by a fixed quantity so as to obtain a detected light energy distribution that is symmetrical between opposite values of the optical path length difference.

The slit 4 enables an observation field of the spectrophotometer to be scanned by the device 1 rotating about axis A-A, using strips of large width, corresponding to the distance $\delta y_s$ on the matrix 8. The scanning speed of the device 1 about the axis Z-Z can then be increased by the ratio $\delta y_s/\delta y_i=\delta\lambda_s/(\delta\lambda_d+\delta\lambda_i)$.

Figure 3B:
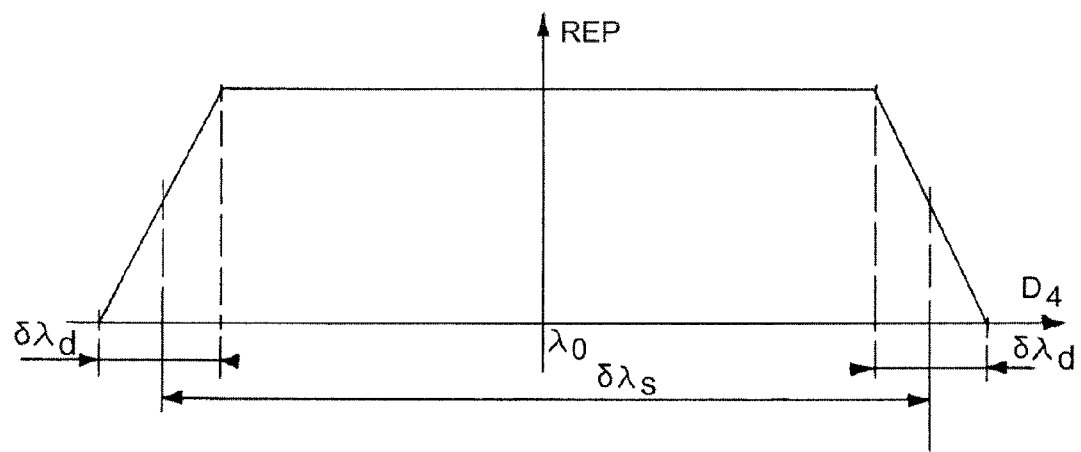

Furthermore, as shown in FIG. 3b, the response function Rep is more uniform along a row of photodetectors L. As a result, operating conditions for the spectrophotometer are obtained, which lead to better precision in the imaging result and in the spectral analysis.

Finally, another advantage of such a spectrophotometer results from the fact that the effective spatial resolution and spectral resolution are determined by the structure of the echelette-grating mirror 33. Given that the entire spectrophotometer is static, i.e., does not have any moving parts, measurements, both spatial measurements and spectral measurements, can be very accurate provided the mirror 33 is initially calibrated with precision and provided it is made out of a material that is thermally stable and relatively undeformable.

Naturally, the principle of the invention can be applied identically to a spectrophotometer in which some of the optical elements described are arranged in a different order along the path of the light beams. This applies in particular to the slit 4 which can be placed in equivalent manner at a plurality of locations in the spectrophotometer. Similarly, the invention can be applied to a spectrophotometer that is adapted to operate on light emitted by sources situated at a finite distance from the spectrophotometer inlet.

Although the invention is described using an intermediate lens 10 disposed at the outlet of the interferometer 3, such an intermediate lens is not essential for implementing the invention. It can therefore be omitted, in particular in order to obtain a spectrophotometer that is lighter in weight and more compact. Under such circumstances, the slit 4 is located within the interferometer 3, e g. on the mirrors 32 and/or 33.

Finally, although the invention has been described in detail for a spectrophotometer that includes a Fourier transform interferometer, it should be understood that it could be applied to a spectrophotometer including an interferometer of some other type. To do this, it suffices that the interferometer is arranged to produce interferograms from an inlet light beam.

The invention claimed is:
1. A spectrophotometer comprising:
a matrix of photodetectors distributed in columns and rows along two perpendicular directions, said matrix of photodetectors being placed in an image plane of the spectrophotometer;
an interferometer arranged to produce, on a column of the matrix of photodetectors, an interferogram of a light source situated in an inlet field of the spectrophotometer;
a dispersive system arranged on the path of light beams passing through the interferometer, and arranged to disperse light parallel to the rows of the matrix of photodetectors; and
a slit arranged in an intermediate image plane between the inlet of the spectrophotometer and the matrix of photodetectors, the slit having a width direction conjugated with the row direction of the matrix of photodetectors;
the spectrophotometer being characterized in that the interferometer has a spectral resolution less than a spectral sampling interval of the photodetectors along the row direction of the matrix, and in that the width of the slit is adapted so that the spectral resolution of the dispersive system generated by the slit is greater than the spectral sampling interval of the photodetectors along the row direction of the matrix.

2. A spectrophotometer according to claim 1, wherein the width of the slit is further adapted so that a dimension of the image of the slit on the matrix of photodetectors is equal to the dimension of the photodetectors multiplied by R, said dimensions of the image of the slit and of the photodetectors being measured along the row direction of the matrix of photodetectors, where R is the quotient of the spectral sampling interval of the photodetectors along the row direction of the matrix divided by the spectral resolution of the interferometer.

3. A spectrophotometer according to claim 1, wherein the interferometer includes a Michelson apparatus.

4. A spectrophotometer according to claim 3, wherein the Michelson apparatus is provided with a planar mirror and an echelette-grating minor arranged for reflecting respective portions of a light beam emitted by a source situated in the inlet field of the spectrophotometer.

5. A spectrophotometer according to claim 3, wherein the Michelson apparatus is provided with two echelette-grating mirrors arranged for reflecting respective portions of a light beam emitted by a source situated in the inlet field of the spectrophotometer.

6. A spectrophotometer according to claim 3, wherein the slit is placed within the interferometer.

7. A spectrophotometer according to claim 1, further including a scanner device arranged at the inlet of the spectrophotometer, having two scanning directions respectively conjugated with the column direction and the row direction of the matrix of photodetectors.

8. A satellite including a spectrophotometer claim 1, on board said satellite.

* * * * *

UNITED STATES PATENT AND TRADEMARK OFFICE
CERTIFICATE OF CORRECTION

PATENT NO. : 7,564,560 B2  Page 1 of 1
APPLICATION NO. : 11/564455
DATED : July 21, 2009
INVENTOR(S) : Frédérick Pasternak It is certified that error appears in the above-identified patent and that said Letters Patent is hereby corrected as shown below:

Column 10, lines 10-11,
- in claim 4: "an echelette-grating minor" is replaced with "an echelette-grating mirror".

Column 10, line 26,
- in claim 8: "a satellite including a spectrophotometer claim 1" is replaced with "a satellite including a spectrophotometer according to claim 1".

Signed and Sealed this

Seventeenth Day of August, 2010

David J. Kappos
*Director of the United States Patent and Trademark Office*